United States Patent
Marey et al.

(10) Patent No.: US 12,347,012 B2
(45) Date of Patent: Jul. 1, 2025

(54) SENTIMENT-BASED INTERACTIVE AVATAR SYSTEM FOR SIGN LANGUAGE

(71) Applicant: Rovi Guides, Inc., San Jose, CA (US)

(72) Inventors: Yusuf AbdElhakam AbdElkader Marey, Tulsa, OK (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/411,611

(22) Filed: Jan. 12, 2024

(65) Prior Publication Data

US 2024/0153186 A1     May 9, 2024

Related U.S. Application Data

(63) Continuation of application No. 17/240,128, filed on Apr. 26, 2021, now Pat. No. 11,908,056.

(51) Int. Cl.
*G06T 13/40* (2011.01)
*G06F 40/47* (2020.01)
(Continued)

(52) U.S. Cl.
CPC .............. *G06T 13/40* (2013.01); *G06F 40/47* (2020.01); *G06T 13/205* (2013.01); *G06V 40/174* (2022.01); *G06V 40/20* (2022.01); *G09B 21/009* (2013.01); *G10L 15/1815* (2013.01); *G10L 15/22* (2013.01); *G10L 21/10* (2013.01); *G10L 25/63* (2013.01); *G10L 2021/065* (2013.01)

(58) Field of Classification Search
CPC ....... G06F 40/47; G09B 21/009; G06T 13/40; G06T 13/205; G06V 20/46; G06V 40/171; G06V 40/174; G06V 40/20; G10L 15/1815; G10L 15/22; G10L 21/10; G10L 25/63; G10L 2021/065
USPC ......................................................... 345/473
See application file for complete search history.

(56) References Cited

U.S. PATENT DOCUMENTS

| | | |
|---|---|---|
| 7,761,892 B2 | 7/2010 | Ellis et al. |
| 10,885,692 B2 * | 1/2021 | Wedig ..................... G06T 17/20 |
| | (Continued) | |

OTHER PUBLICATIONS

Darcey Pittman, "Students create app to translate sign language", Washington Square News Apr. 2018, 4.
(Continued)

*Primary Examiner* — Jacinta M Crawford
(74) *Attorney, Agent, or Firm* — Haley Guiliano LLP

(57) ABSTRACT

Systems and methods for doing presenting an avatar that speaks sign language based on sentiment of a speaker is disclosed herein. A translation application running on a device receives a content item comprising a video and an audio, wherein the audio comprises a first plurality of spoken words in a first language. The video comprises a character speaking the first plurality of spoken words in the first language. The translation application translates the first plurality of spoken words of the first language into a first sign of a first sign language. The translation application determines an emotional state expressed by the character based on sentiment analysis. The translation application generates an avatar that speaks the first sign of the first sign language where the avatar exhibits the determined emotional state. The content item and the avatar are presented for display on the device.

18 Claims, 10 Drawing Sheets

(51) Int. Cl.
*G06T 13/20* (2011.01)
*G06V 40/16* (2022.01)
*G06V 40/20* (2022.01)
*G09B 21/00* (2006.01)
*G10L 15/18* (2013.01)
*G10L 15/22* (2006.01)
*G10L 21/10* (2013.01)
*G10L 25/63* (2013.01)
*G10L 21/06* (2013.01)

(56) References Cited

U.S. PATENT DOCUMENTS

| | | |
|---|---|---|
| 11,438,669 B2 | 9/2022 | Janugani et al. |
| 2014/0171036 A1 | 6/2014 | Simmons |
| 2019/0138607 A1 | 5/2019 | Zhang et al. |
| 2020/0294525 A1 | 9/2020 | Santos et al. |
| 2022/0335971 A1 | 10/2022 | Gruszka et al. |
| 2022/0343576 A1 | 10/2022 | Marey et al. |

OTHER PUBLICATIONS

Lyuba Azbel, "How do the deaf read?", The paradox of performing a phonemic task without sound, 2004, 21.

* cited by examiner

SENTIMENT-BASED INTERACTIVE AVATAR SYSTEM FOR SIGN LANGUAGE

CROSS-REFERENCE TO RELATED APPLICATION

This application is a continuation of U.S. patent application Ser. No. 17/240,128, filed Apr. 26, 2021, the disclosure of which is hereby incorporated by reference herein in its entirety.

BACKGROUND

Most audio-visual content items, such as a movie or a live TV show, possess both a video component and an audio component. To fully enjoy the audio-visual content items, comprehension of both the video component and the audio component is necessary. However, this may not be the case for people with hearing impairment (i.e., deafness). To address this issue, in one existing approach, the audio-visual content item is provided with a text version of the audio component, such as a subtitle or closed caption.

This approach is deficient because American Sign Language (ASL) is the most commonly used language by the deaf people in America. In the U.S., most deaf people prefer ASL to English. For example, hearing individuals read by converting text into phonological code that feeds into the auditory language system. Some deaf people, such as congenitally or profoundly deaf people (i.e., those who have had loss of hearing present at birth), do not have the sound that makes up the words. Therefore, performing a phonemic task such as reading a rapidly moving text on the screen while watching the audio-visual content item demonstrates a difficulty a deaf person can experience. This may prevent the deaf person from thoroughly enjoying the audio-visual content item within a reasonable time. Furthermore, because the deaf person may be focusing on reading the text, the deaf person may inadvertently miss the visual component, such as emotions that are expressed by a character in the audio-visual content (e.g., facial expression).

SUMMARY

To overcome such deficiencies, the methods and systems are described herein for providing signs for the audio component of the audio-visual content item. This is performed by generating a virtual avatar that speaks sign language and presenting the audio-visual content item with the avatar for concurrent display. For example, a translation application receives a content item that is requested by a user. The content item comprises a video component and an audio component. The audio component includes one or more words spoken in a first language (e.g., English). The translation application translates the words of the first language (e.g., "I am happy") into a first sign of the first sign language (e.g., American Sign Language). The translation application determines an emotional state of a character who speaks the words in the first language in the content item. For example, the emotional state may be determined by at least spoken words of the first language, vocal tone, facial expression, or body expression of the character in the video. The translation application generates an avatar that performs the first sign of the first sign language (e.g., performing a "happy" sign), exhibiting the previously determined emotional state (e.g., happy expression on the face of the avatar). The content item and the avatar are concurrently presented to the user for display.

In some embodiments, an avatar may be customized based on user preference or user input. For example, the user may change the visual characteristics of the avatar, such as a hairstyle or an eye color. In some embodiments, an image-capturing device (e.g., camera) may be used to capture an appearance of the user and modify the visual characteristic of the avatar based on the captured image, resulting in an avatar with similar visual attributes to the user (e.g., same body shape or clothes). A user may customize various features of the avatar so that the avatar resembles the user in appearance as the avatar is in the real world. Any person in proximity to the device may be captured, and the captured image may be used to generate an avatar of interest. In some embodiments, a special avatar may be generated based on a public figure or virtual character of a content item (e.g., hobbit).

In some embodiments, a tone or mood of a character in the content item is determined and expressed by the avatar to indicate an emotional state of the character (e.g., mocking, sarcastic, laughing). The translation application may determine the emotional state of the character using one or more emotion recognition techniques. For example, the translation application performs sentiment analysis, such as determining a facial expression (e.g., smiling), a body expression (e.g., big movement of arms), a vocal tone (e.g., high pitch), or an emotion identifier word in the spoken words (e.g., the word "happy"). The determined emotional state of the character is reflected in the face and body of the avatar to mimic the emotion of the character.

In some embodiments, an avatar may reflect a tone and expression of a user or anyone in proximity to the device. For example, an image-capturing module of the user device (e.g., cell phone) may be used to capture an image of the user or anyone in proximity to the device (e.g., a person with whom the user is interacting) to imitate the facial or body expression of the captured person. Similar emotion-determination techniques described above may be used. In addition to the image-capturing device, a voice-capturing device (e.g., microphone) of the user device may also be used to capture the vocal tone to determine the emotional state of the captured person speaking.

In some embodiments, the spoken words contained in the speech are converted into text using one or more speech recognition techniques. Any machine learning-based speech-to-text algorithms may be used to convert a speech to text. For example, a visual speech recognition technique, such as a lipreading technique, may be used to interpret the movements of the lips, face, or tongue of a speaker to decipher the speech.

Subsequent to speech-to-text conversion, the translation application translates the text into sign language. The translation application parses the text and processes one word at a time to identify a corresponding sign. For example, the translation application queries a sign language database for each parsed word to identify a corresponding sign stored in the database. The translation application may use a database of words that are pre-mapped to images or videos showing gestures or movements of corresponding signs. The sign language database may include a sign language dictionary for any language.

The translation application animates the movement of hands, fingers, and facial expressions of an avatar by changing the relative positions of the hands, fingers, arms, or parts of the face of the avatar. For example, an avatar has one or more skeleton models that refer to different parts of the body. A hand model includes references to the different fingers (e.g., index finger, middle finger, ring finger). An arm model references different parts of the arm (e.g., above the elbow, below the elbow). A face model includes references to different parts of the face, such as the left eye, right eye, forehead, lips, etc.

Based on the images or videos showing gestures of corresponding signs stored in the database, the transformation of the avatar is performed. The transformation (e.g., up, down, pitch roll, etc.) is applied to corresponding parts of the body using one or more skeleton models. For example, based on the images or videos that include a movement of certain parts of the body, the translation application identifies the moving parts of the body and identifies one or more relevant skeleton models that are required to perform the sign. In one example, the sign for "sorry" can be made by forming an "A" with a right hand and rotating the hand on the chest using a clockwise motion. Performing the "sorry" sign, therefore, requires the arm model and the hand model. The translation application identifies relevant references such as corresponding joints (e.g., elbow, wrist) and animates the movement of the arm and hand of the avatar by changing relative positions of the respective joints of the avatar to correspond to the gesture shown in the video stored in the database.

The translation application then streams the movement of the avatar to user equipment (e.g., a phone) as a series of images that are displayed in sequence as a video. The avatar may be displayed with the content item in PIP (Picture-In-Picture). The avatar may be displayed in a separate window on a display device. The avatar may be a live avatar performing the signs in real time.

In some embodiments, the translation application animates the avatar based on user input specifying a command. For example, a user may type in a specific command in a user interface, such as "wave the right hand." The user already knows that waving the right hand means "hello." If the user does not want to type in "hello," then the user can simply input the command "wave the right hands" instead. The command is transmitted to a server, and the transformation of the avatar is executed on a user device based on the user input. The avatar is animated to move the right hand according to the command. In some embodiments, the translation application translates the command to a corresponding sign. For example, if the user types in "I am sorry," then the translation application identifies a sign corresponding to "I am sorry" and presents the avatar performing the "sorry" sign for display.

In some embodiments, the translation application receives a request to transfer the avatar to a different device. For example, a user is at a clothing store, and the user may initiate a transfer of the user's avatar to a commercial kiosk that is configured to display the user's avatar. The personalized avatar setting (e.g., skin tone, hair) may be stored in a configuration file that is part of the translation application running on the user device and is shared to the kiosk system using any sharing protocols, such as Bluetooth or NFC (i.e., Near Field Communication). This way, the user does not have to use their own device to communicate with another party (i.e., non-sign users), but the user's personalized avatar can be displayed on a device different from the user device.

The present disclosure addresses one or more comprehension issues the deaf person may experience by providing graphical representations of a real-time live avatar that speaks sign language and exhibits an emotion of a speaker on a display screen of the computing device. The present disclosure adds significant solutions to the existing problems, such as having to perform a phonemic task and not being able to fully grasp the visual component of the audio-visual content. Thereby, the present disclosure allows the deaf person to consume the content item asset within a reasonable time, understand the emotions of the speaker, and facilitates direct communication with non-sign users, resulting in an improved communication or content item environment for the deaf person.

It should be noted that the systems, methods, apparatuses, and/or aspects described above may be applied to, or used in accordance with, other systems, methods, apparatuses, and/or aspects described in this disclosure.

DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
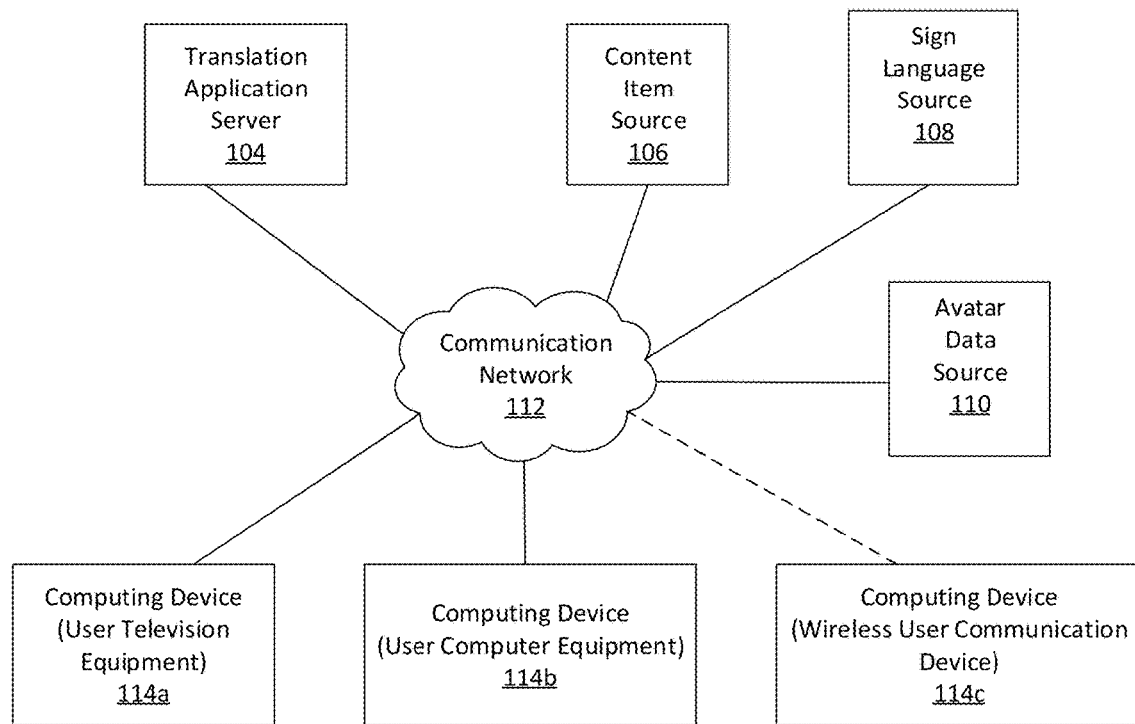
FIG. 1 depicts an illustrative block diagram of a system for generating an avatar that performs signs, in accordance with some embodiments of the disclosure.

FIG. 1 shows an illustrative block diagram of a system 100 for translating to sign language, in accordance with some embodiments of the disclosure. In one aspect, system 100 includes one or more translation application server 104, content item source 106, sign language source 108, and communication network 112.

Communication network 112 may be one or more networks including the Internet, a mobile phone network, mobile voice or data network (e.g., a 5G or LTE network), cable network, public switched telephone network, or other types of communication network or combinations of communication networks. Communication network 112 includes one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. Communication network 112 communicatively couples various components of system 100 to one another. For instance, translation application server 104 may be communicatively coupled to content item source 106, and/or sign language source 108 via communication network 112.

A video-hosting web server (not shown) hosts one or more video websites that enable users to download or stream videos, video clips, and/or other types of content. In addition to enabling users to download and view content, the video websites also provide access to data regarding downloaded content such as subtitles, closed caption data, metadata, or manifest.

Content item source 106 may be the originator of content (e.g., a television broadcaster, a Webcast provider, etc.) or may not be the originator of content (e.g., an on-demand content provider, an Internet provider of content of broadcast programs for downloading, etc.). Content item source 106 may include cable sources, satellite providers, on-demand providers, Internet providers, over-the-top content providers, or other providers of content. Content item source 106 may also include a remote content item server used to store different types of content (e.g., including video content selected by a user) in a location remote from computing device 114 (described below). Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Sign language source 108 may provide sign language-related data, such as one or more sign language dictionaries to computing device 114 or translation application server 104 using any suitable approach. Any types of sign languages such as American sign language, Korean sign language, or Spanish sign language may be provided. Sign language source 108 may include images or videos of sign language signs, fingerspelled words, and other signs that are used within a country associated with a dictionary. Sign language source 108 may include a database of pre-mapping of words to sign language signs that are already defined or commonly used.

Avatar data source 110 may store avatar-related data, characters, rules, models, polygonal or deformable mesh structures, configuration files, or definitions that are used to generate an avatar. Avatar data source 110 may store a set of expression rules that defines a set of feelings that can be expressed by an avatar (e.g., happy, sad, angry). For each feeling, a set of rules or definitions may be predefined, such that a "surprise" feeling corresponds to raising an eyebrow and opening up a mouth by a certain amount. Each rule or definition for feelings may be predefined by deforming or reconstructing the facial features of the polygonal mesh of the avatar and associating the anatomical structures with a corresponding feeling.

In some embodiments, content item data from a video-hosting server may be provided to computing device 114 using a client/server approach. For example, computing device 114 may pull content item data from a server (e.g., translation application server 104), or the server may push content item data to computing device 114. In some embodiments, a client application residing on computing device 114 may initiate sessions with sign language source 108 to obtain sign language data for the content item data when needed.

Content and/or content item data delivered to computing device 114 may be over-the-top (OTT) content. OTT content delivery allows Internet-enabled user devices, such as computing device 114, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer I.P. packets provided by the OTT content provider. Examples of OTT content providers include YouTube™, Netflix™, and HULU, which provide audio and video via I.P. packets. YouTube™ is a trademark owned by Google Inc., Netflix™ is a trademark owned by Netflix Inc., and Hulu is a trademark owned by Hulu, LLC. OTT content providers may additionally or alternatively provide content item data described above. In addition to content and/or content item data, providers of OTT content can distribute applications (e.g., web-based applications or cloud-based applications), or the content can be displayed by applications stored on computing device 114.

As described in further detail below, translation application server 104 accesses the content of the video website(s) hosted by a video-hosting web server (not shown) and, based on the data associated with accessed content, generates a virtual avatar performing signs corresponding to the lines spoken in the video.

System 100 also includes one or more computing devices 114, such as user television equipment 114a (e.g., a set-top box), user computer equipment 114b, and wireless user communication device 114c (e.g., a smartphone device or remote control), which users can use to interact with translation application server 104, sign language source 108, and/or content item source 106, via communication network 112, to search for desired content item content. For instance, in some aspects, translation application server 104 may provide a user interface via computing device 114, by which a user can input a query for a particular item of content item content made available by content item source 106, and generate signs for the content item in response to the query by accessing and/or processing data, closed caption data, subtitles, manifest, and/or metadata. Although FIG. 1 shows one of each component, in various examples, system 100 may include multiples of one or more illustrated components.

Figure 2:
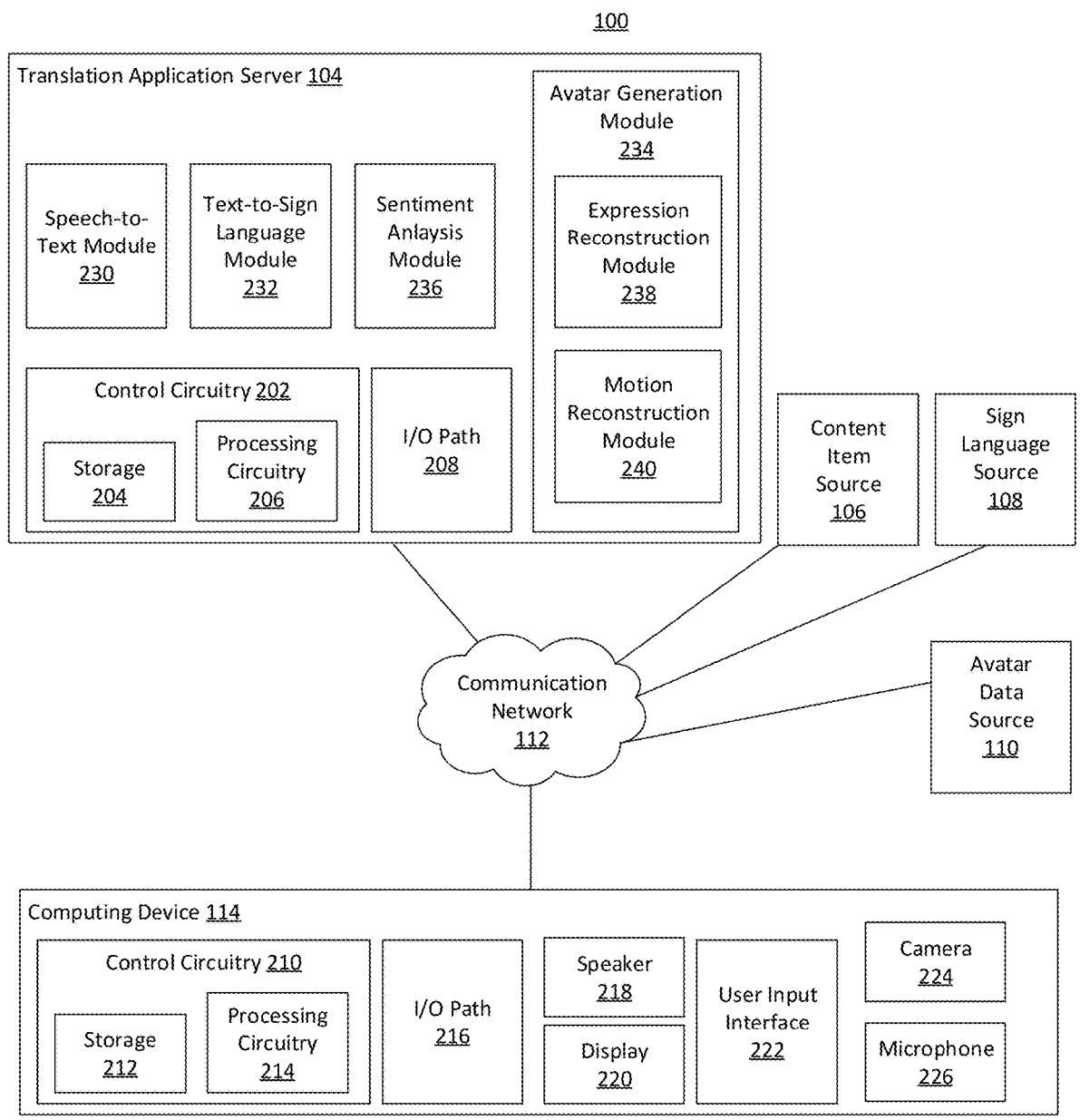
FIG. 2 depicts an illustrative block diagram showing additional details of the system of FIG. 1, in accordance with some embodiments of the disclosure.

FIG. 2 is an illustrative block diagram showing additional details of the system 100 of FIG. 1, in accordance with some embodiments of the disclosure. In particular, translation application server 104 includes control circuitry 202 and Input/Output (I/O) path 208, a speech-to-text module 230, a text-to-sign language module 232, or avatar generation module 234, sentiment analysis module 236, and control circuitry 202 includes storage 204 and processing circuitry 206. Computing device 114 includes control circuitry 210, I/O path 216, speaker 218, display 220, user input interface 222, camera 224, and microphone 226. Control circuitry 210 includes storage 212 and processing circuitry 214. Control circuitry 202 and/or 210 may be based on any suitable processing circuitry such as processing circuitry 206 and/or 214.

As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 204, storage 212, and/or storages of other components of system 100 (e.g., storages of content item source 106, sign language source 108, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (B.D.) recorders, BLU-RAY 3D disc recorders, digital video recorders (DVR, sometimes called a personal video recorder, or PVR), solid state devices, quantum storage devices, gaming consoles, gaming content item, or any other suitable fixed or removable storage devices, and/or any combination of the same. Each of storage 204, storage 212, and/or storages of other components of system 100 may be used to store various types of content, content item data, and or other types of data. Non-volatile memory may also be used (e.g., to launch a boot-up routine and other instructions). Cloud-based storage may be used to supplement storages 204, 212 or instead of storages 204, 212.

In some embodiments, control circuitry 202 and/or 210 executes instructions for an application stored in memory (e.g., storage 204 and/or 212). Specifically, control circuitry 202 and/or 210 may be instructed by the application to perform the functions discussed herein. In some implementations, any application. For example, the application may be implemented as software or a set of executable instructions that may be stored in storage 204 and/or 212 and executed by control circuitry 202 and/or 210. In some embodiments, the application may be a client/server application where only a client application resides on computing device 114, and a server application resides on translation application server 104.

The application (e.g., translation application) may be implemented using any suitable architecture. For example, it may be a stand-alone application wholly implemented on computing device 114. For example, the translation application may be implemented as software or a set of executable instructions, which may be stored in non-transitory storage 204, 212 and executed by control circuitry 202, 210. In such an approach, instructions for the application are stored locally (e.g., in storage 212), and data for use by the application is downloaded on a periodic basis (e.g., from an out-of-band feed, from an Internet resource, or using another suitable approach). Control circuitry 202, 210 may retrieve instructions for the application from storage 204, 212 and process the instructions to perform the functionality described herein. Based on the processed instructions, control circuitry 202, 210 may determine what action to perform when input is received from user input interface 222 of computing device 114.

In client/server-based embodiments, control circuitry 202, 210 may include communication circuitry suitable for communicating with an application server (e.g., translation application server 104) or other networks or servers. The instructions for carrying out the functionality described herein may be stored on the application server. Communication circuitry may include a cable modem, an integrated services digital network (ISDN) modem, a digital subscriber line (DSL) modem, a telephone modem, an Ethernet card, or a wireless modem for communication with other equipment, or any other suitable communication circuitry. Such communication may involve the Internet or any other suitable communication networks or paths (e.g., communication network 112).

In another example of a client/server-based application, control circuitry 202, 210 runs a web browser that interprets web pages provided by a server (e.g., translation application server 104). For example, the server may store the instructions for the application in a storage device. The remote server may process the stored instructions using circuitry (e.g., control circuitry 202) and generate the displays discussed above and below. Computing device 114 may receive the displays generated by the remote server and may display the content of the displays locally via display 220. This way, the processing of the instructions is performed remotely (e.g., by translation application server 104) while the resulting displays are provided locally on computing device 114. Computing device 114 may receive inputs from the user via input interface 222 and transmit those inputs to the server for processing and generating the corresponding displays.

A user may send instructions to control circuitry 202 and/or 210 received via user input interface 222. User input interface 222 may be any suitable user interface, such as a remote control, trackball, keypad, keyboard, touchscreen, touchpad, stylus input, joystick, voice recognition interface, or other user input interfaces. User input interface 222 may be integrated with or combined with display 220, which may be a monitor, a television, a liquid crystal display (LCD), an electronic ink display, or any other equipment suitable for displaying visual images.

A camera 224 of computing device 114 may capture an image or a video. The image or video may be used in connection with a speech recognition algorithm to decipher a speech by the user. A microphone 226 of computing device 114 may detect sound in proximity to computing device 114 and converts the sound to electrical signals. The detected sounds may be converted to text using voice-to-text techniques.

Translation application server 104 and computing device 114 may receive content and data via I/O paths 208 and 216, respectively. I/O paths 208, 216 may provide content (e.g., broadcast programming, on-demand programming, Internet content, the content available over a local area network (LAN) or wide area network (WAN), and/or other content) and data to control circuitry 202, 210. Control circuitry 202, 210 may be used to send and receive commands, requests, and other suitable data using I/O paths 208, 216. I/O paths 208, 216 may connect control circuitry 202, 210 (and specifically processing circuitry 206, 214) to one or more communication paths (described below). I/O functions may be provided by one or more of these communication paths but are shown as single paths in FIG. 2 to avoid overcomplicating the drawing.

Translation application server 104 includes a speech-to-text module 230, a text-to-sign language module 232, avatar generation module 234, or sentiment analysis module 236. Speech-to-text module 230 converts a speech received via microphone 226 of computing device 114 to text. Speech-to-text module 230 may implement any machine learning speech recognition or voice recognition techniques, such as Google® DeepMind, to decipher the speech of a user or a character in a content item. Text-to-sign language module 232 receives converted text generated by speech-to-text module 230 and translates the text to sign language (e.g., signs). The text can be translated to any sign language, such as American Sign Language, British Sign Language, or Spanish Sign Language. Text-to-sign language module 232 may utilize the sign language source 108 when translating to sign language.

Avatar generation module 234 may generate a virtual avatar performing signs translated by text-to-sign language module 232. Avatar generation module 234 may use a Virtual Reality (VR) rendering technique, such as the Unreal® Engine, to generate a virtual avatar that mimics the user or character's movement and expression. Unreal® Engine is a software development environment suite for building virtual and augmented reality graphics, game development, architectural visualization, content creation, broadcast, or any other real-time applications.

Avatar generation module 234 includes an expression reconstruction module 238 and a motion reconstruction module 240. Expression reconstruction module 238 identifies an emotion of a character in the content item or a non-sign user in real time. Expression reconstruction module 238 may be used to edit the surface representations, such as a facial expression. For example, expression reconstruction module 238 identifies head features, including facial features from the image data of the user or character in the content item, and generates an avatar based on the captured image. Expression reconstruction module 238 deforms or reconstructs the facial features of the polygonal mesh of the avatar, such that moving anatomical structures may be performed by changing coordinates of the respective body parts based on the captured image. For example, the facial expression of the avatar may be changed to map to the facial expression of the user or character. In some embodiments, expression reconstruction module 238 may use a set of predefined expression rules that are stored in avatar data source 110 to animate the facial expression of the avatar. For example, rules or definitions for a "surprise" feeling can be retrieved from avatar data source 110, and deformation or reconstruction of the avatar may correspond to the predefined rules for a "surprise" feeling, such as raising an eyebrow and opening a mouth by a certain amount. Based on the rules, expression reconstruction module 238 may deform or reconstruct the facial features of the polygonal mesh of the avatar, such that moving anatomical structures may be performed by changing coordinates of the respective facial parts.

Motion reconstruction module 240 is configured to animate an avatar by changing the avatar's pose or gesture. An avatar includes a polygonal mesh that includes bones and internal anatomical structure that facilitates the formation and movements of the body parts. In some embodiments, a directed acyclic graph (DAG) may be used for skeleton models such that each joint has connecting nodes and structure. For example, a hand has a child node such as a ring finger and index finger. Motion reconstruction module 240 deforms, reconstructs, or moves a deformable polygonal mesh that includes a set of interconnected joints for animating the avatar. An avatar may be expressed in the XML language. Motion reconstruction module 240 may use any moving picture techniques in converting the sign language data to sign language motion data. For example, motion reconstruction module 240 identifies position and orientation data contained in the sign language image or video stored in sign language source 108. The data may include a location (e.g., coordinates and rotational measures) for each body part for performing a sign. Motion reconstruction module 240 deforms or reconstructs a polygonal mesh to approximate a movement of a sign gesture and maps the movement.

In some embodiments, avatar data source 110 stores a library of data for a set of skeleton data that are pre-mapped to corresponding signs. For example, a default mesh structure that performs a sign is stored with a label for a corresponding sign in avatar data source 110 as a moving image. When a character speaks the corresponding word ("e.g., what"), the default mesh structure that performs the sign is retrieved with skeleton data from avatar data source 110. The surface representation of the default avatar is edited such that the virtual characteristics of the avatar resemble the appearance of the character (e.g., clothing, hair).

Translation application server 104 includes a sentiment analysis module 236. Sentiment analysis module 236 uses natural language processing, text analysis, computational linguistics, or other parameters to identify an emotional state of a speaker. In some embodiments, speech-to-text module 230, a text-to-sign language module 232, avatar generation module 234, or sentiment analysis module 236 may be separate software components stored in storage 204 or rendering engines working in connection with the translation application.

Figure 3:
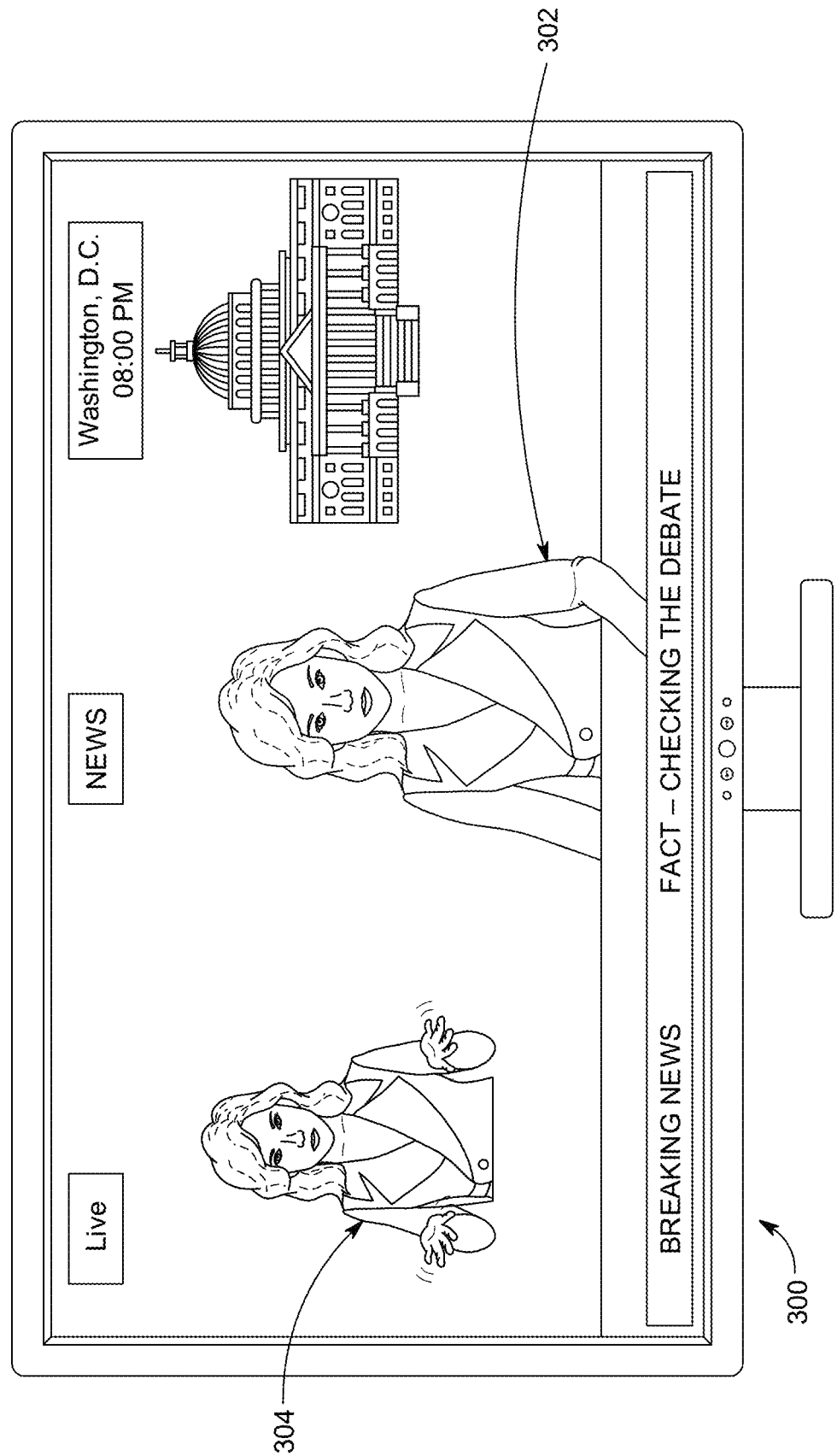
FIG. 3 depicts an exemplary user interface for presenting a live avatar with a content item for display on an illustrative device, in accordance with some embodiments of the disclosure.

Having described system 100, reference is now made to FIG. 3, which depicts an example user interface 300 for presenting a live avatar with a content item for display on the illustrative device that may be implemented using system 100, in accordance with some embodiments of the disclosure. Reference is also made to FIGS. 4-8, which show example user interfaces 400, 500, 600, 700, 800 generated by system 100, in accordance with some embodiments. Although FIGS. 3-8 depict a certain type of user device, it will be understood that any suitable device for displaying video content may be used, such as gaming equipment, user computer equipment, a kiosk, or a wireless user communications device.

The user device may have control circuitry 210 of FIG. 2 configured to request the video content of the content item from a server for display. It will be understood that consistent with the present disclosure, any content item may be requested for streaming or downloading from translation application server 104.

As referred to herein, the term "content item" should be understood to mean an electronically consumable user asset, such as an electronic version of a printed book, electronic television programming, as well as pay-per-view program, on-demand program (as in video-on-demand (VOD) system), Internet content (e.g., streaming content, downloadable content, Webcasts, etc.), video clip, audio, content information, picture, rotating image, document, playlist, website, article, book, article, newspaper, blog, advertisement, chat session, social content item, application, games, and/or any other content item or multi content item and/or combination of the same.

When a user requests a presentation of a content item (e.g., live news) on a computing device (e.g., TV) 114 via the translation application, the translation application requests the content item from content item source 106. In response to the request, the content item is presented on computing device 114. As shown in exemplary interface 300, a female anchor 302 is running a live news program. As the anchor 302 is speaking, the translation application translates the speech into sign language. In one embodiment, the user may specify a particular sign language for the text to be translated into prior to the presentation of the content item. In another embodiment, the preferred sign language may be stored in a user profile associated with the computing device 114.

The translation application may convert the speech to text using speech-to-text module 230. If closed caption data is received with the content item, the speech-to-text conversion step may be skipped. If the closed caption data is not available, then the speech-to-text module first converts the anchor's speech to text using any speech recognition techniques or voice recognition techniques. In one example, the translation application uses the lipreading techniques to interpret the movements of the lips, face, or tongue of the speaker to decipher the speech. Because the content item is broadcast in real time (e.g., live news), the conversion may be performed in real time. The converted text may be in a language that is specified by the user or in a language that is spoken by anchor 302.

Once the translation application converts the speech to text, the translation application uses text-to-sign language module 232 to translate the text to corresponding signs by querying sign language source 108. For example, the translation application queries sign language source 108 for each word in the text and identifies a corresponding sign. Sign language source 108 includes a sign language dictionary that contains several videos or images of sign language signs, fingerspelled words, or other common signs used within a particular country. Based on the corresponding gestures or motions contained in the videos or images, the translation application identifies a corresponding sign for the text.

Based on the sign gesture contained in the video, the translation application identifies one or more relevant skeleton models that are involved in making the corresponding sign. From the videos stored in sign language source 108, the translation application identifies coordinate differences of the initial positions and the final positions of the joints when making the motion associated with the sign. As shown by an avatar displayed in exemplary user interface 800 of FIG. 8, one or more skeleton models are involved in making the motion, and each model references different joints of the body. For example, a hand skeleton model includes references to the different wrists 804 (e.g., right wrist, left wrist). An arm model references different elbows 802 (e.g., above the elbow, below the elbow). A face model includes references to different parts of the face 806, such as the left eye, right eye, forehead, nose, lips, etc. Although three skeleton models are identified above as an example, there may be other skeleton models that involve different parts of the body to perform a sign.

The translation application generates an avatar that performs the identified sign using the identified skeleton models. This is accomplished by positioning the vertices of the avatar according to one or more skeleton models that apply to the identified sign. Thus, the translation application modifies animation parameters of the joints (e.g., vertices) of the avatar associated with the skeleton model based on the movement or gesture (e.g., relative coordinates differences) contained in the visual content stored in sign language source 108.

The joints are connected such that changes to one or more vertices affect other parts of the joints, resulting in a balanced movement of the avatar. The translation application animates the movement of hands, fingers, and facial expressions of an avatar by changing the relative position of the joints in the hands, fingers, arms, or other parts of the face of the avatar.

Animating the movement may be achieved by motion reconstruction module 240 that is configured to animate an avatar by changing the avatar's pose or gesture. An avatar may include a polygonal mesh structure that includes bones and other anatomical structure that facilitates the formation and movements of the body parts. In some embodiments, a directed acyclic graph (DAG) may be used for skeleton models such that each joint has connecting nodes and structure. For example, a hand has a child node such as a ring finger and index finger. Motion reconstruction module 240 deforms, reconstructs, or moves a deformable polygonal mesh that includes a set of interconnected joints for animating the avatar. An avatar may be expressed in the XML language. Motion reconstruction module 240 may use any moving picture techniques in converting the sign language data to sign language motion data. For example, motion reconstruction module 240 identifies position and orientation data contained in the sign language image or video stored in sign language source 108. The data may include a location (e.g., coordinates and rotational measures) for each body part for performing a sign. Motion reconstruction module 240 deforms or reconstructs a polygonal mesh to approximate a corresponding sign gesture and mirrors the movement.

In some embodiments, avatar data source 110 stores a library of data for a set of skeleton data that are pre-mapped to corresponding signs. For example, a default mesh structure that performs a sign is stored with a label for a corresponding sign in avatar data source 101 as a moving image. When female anchor speaks 302 the corresponding word ("e.g., what"), the default mesh structure that performs the sign is retrieved with skeleton data from avatar data source 110. The surface representation of the default avatar is edited such that the virtual characteristics of avatar 304 resembles female anchor 302 (e.g., clothing, skin tone, hair).

The translation application determines an emotional state of the character using sentiment analysis 236. For example, the emotional state may be determined by at least one of the spoken words of the speech, vocal tone, facial expression, or body expression of the character in the content item. For example, if the text includes an emotion identifier word (e.g., the word "happy"), then the translation application is likely to determine that the emotion of the speaker is happy. In another example, if the speaker is smiling or makes a big movement with the arms, then the translation application is likely to determine that the speaker is happy based on the facial or body expression of the speaker. This can be achieved by image analysis of the content. If the speaker speaks with a certain pitch (e.g., high pitch), then the translation application is likely to determine that the speaker is happy based on the vocal tone of the speaker. The translation application may determine the emotional state of the speaker based on the context of the content item or metadata of the content item. Based on the metadata, which includes chapter information (e.g., ending scene), the translation application may infer the emotional state of the speaker. The above means of determining the emotional state of the speaker are not an exclusive list: there may be many other emotion-determination means that are not listed above.

The generated avatar that speaks the translated sign language (e.g., performing a "happy" sign) exhibits the previously determined emotional state (e.g., happy expression on the face of the avatar). Thus, the tone or mood of the character in the content item is expressed by the avatar to indicate an emotional state of the character (e.g., mocking, sarcastic, laughing). The determined emotional state of the character is reflected in the face and body of the avatar to mimic the emotion of the character. As shown in exemplary embodiment 300 of FIG. 3, the facial expression of avatar 304 corresponds to the facial expression of female anchor 302 (e.g., serious, due to running a serious news program regarding fact-checking a debate).

Reflecting the emotion of the speaker may be achieved by expression reconstruction module 238, which is used to edit the surface representations, such as a facial expression. For example, expression reconstruction module 238 identifies head features, including facial features from the image data of female anchor 302, and generates an avatar based on the captured image. Expression reconstruction module 238 deforms or reconstructs the facial features of the polygonal mesh of the avatar, such that moving anatomical structures may be performed by changing coordinates of the respective body parts based on the captured image to approximate the facial expression. For example, the facial expression of the avatar may be changed to map to the facial expression of the female anchor 302.

In some embodiments, expression reconstruction module 238 may use a set of predefined expression rules that are stored in avatar data source 110 to animate the facial expression of the avatar. For example, upon determining that the tone or mood of female anchor 302 is "serious," the rules or definitions for a "serious" feeling can be retrieved from avatar data source 110. The deformation or the avatar 304 corresponding to the predefined rules for a "serious" feeling, such as stiff jawline and narrow eyes, may be executed. Based on the rules, expression reconstruction module 238 may deform or reconstruct the facial features of the polygonal mesh of the avatar 304, such that moving anatomical structures may be performed by changing relative coordinates of the respective facial parts.

The content item and the avatar are concurrently presented to the user for display. The translation application generates a two-dimensional or three-dimensional graphical representation of the avatar via a user interface and renders the avatar with the content item for display. The movement of the avatar is displayed on the display device as a series of images that are displayed in sequence as a video.

Figure 4:
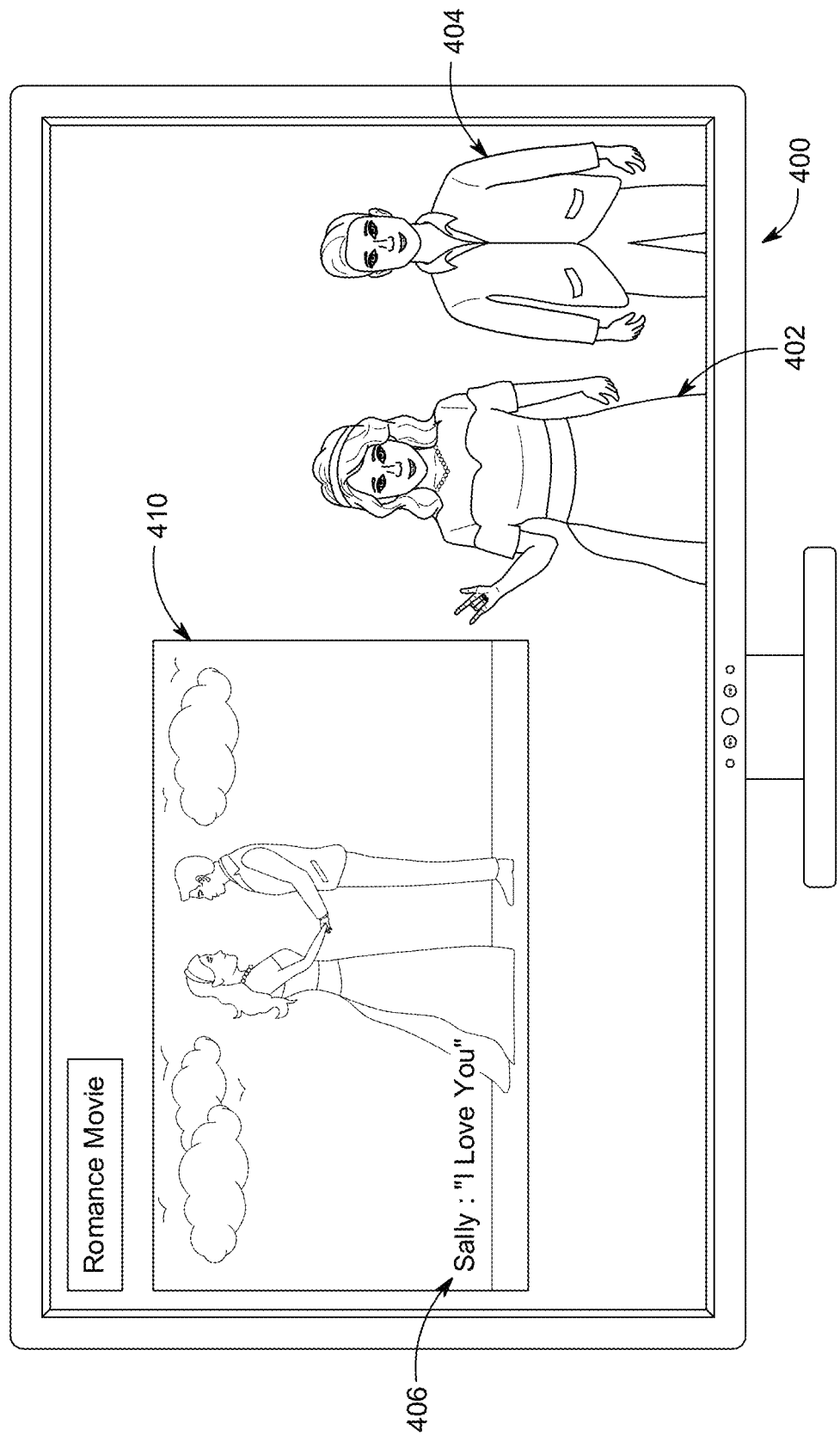
FIG. 4 depicts an exemplary user interface for presenting an avatar that corresponds to a character in the content item for display on an illustrative device, in accordance with some embodiments of the disclosure.

FIG. 4 depicts an exemplary user interface 400 for presenting avatars corresponding to characters in the content item on an illustrative device, in accordance with some embodiments of the disclosure. As shown in exemplary user interface 400, a romantic movie featuring two characters, 'one female character and one male character,' is displayed on the illustrative device. In some embodiments, the translation application may generate one or more avatars based on the number of characters displayed in the content item. In exemplary user interface 400, two avatars are generated, each corresponding to the displayed character in the movie: a female avatar 402 corresponding to the female character (Sally) and a male avatar 404 corresponding to the male character. Each avatar may perform signs corresponding to the lines spoken in the content item. As shown in exemplary user interface 400, as Sally says, "I love you," female avatar 402 corresponding to the female character (i.e., Sally) performs the "I love you" sign.

The translation application performs sentiment analysis for each character displayed in the content item using emotion-detection techniques described above. In contrast to FIG. 3, exemplary user interface 400 of FIG. 4 shows a different emotional state ("happy") of the character. In a romantic scene of the movie, when Sally is speaking the line "I love you," the translation application infers that Sally is probably happy based on the context of the movie and the words spoken by Sally. Therefore, the happy feeling is exhibited on the face of Sally's avatar 402 (e.g., smiling with teeth and shiny eyes).

In some embodiments, the appearance of the avatars resembles the appearance of the characters in the content item. As shown in exemplary interface 400, female avatar 402 is displayed as wearing the same clothes as the female character, such as the same hairband, dress, or necklace. This allows the user to feel like the actual character in the content item is speaking the sign language, resulting in a more active engagement with the content item.

To minimize the amount of obstruction caused by the avatar, the translation application may determine a non-focus area of the video. A non-focus area is a portion of a frame of the displayed content where an avatar can be generated. The non-focus area features less important content, such as the background of the scene (e.g., forest or ocean). The translation application retrieves metadata of the displayed content and identifies a candidate non-focus area for each frame. For example, if a portion of frames include action scenes where the objects in the frame are rapidly moving, then a non-focus area may be changed accordingly. On the other hand, if a portion of frames includes static scenes as shown in exemplary user interface 300, an avatar is placed at a default location of the frame and may remain in the same location for a portion of the content item.

An avatar may be generated in various display modes. As shown in exemplary user interface 300, an avatar may be displayed in Picture-In-Picture (PIP) display. An avatar may be in a multi-window mode that is separate from a window that contains the video, as shown in exemplary user interface 400. The window of the avatar may be pinned to any corner of the screen during the display.

Figure 5:
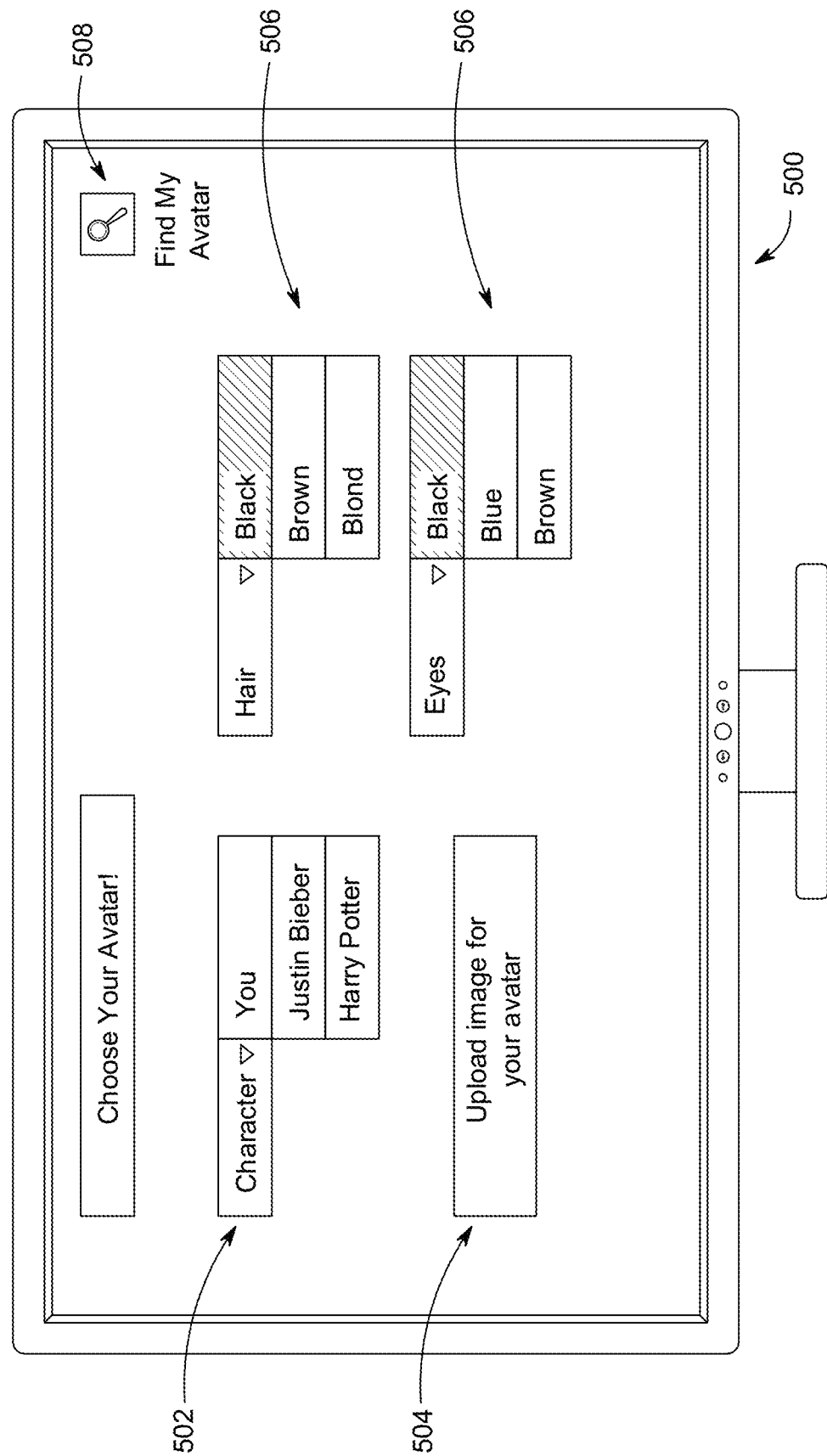
FIG. 5 depicts an exemplary user interface for customizing an avatar on an illustrative device, in accordance with some embodiments of the disclosure.

FIG. 5 depicts an exemplary user interface 500 for customizing an avatar on an illustrative device, in accordance with some embodiments of the disclosure. In some embodiments, an avatar may be customized based on user preference or user input. For example, the user may change the visual characteristics of the avatar, such as a hairstyle or an eye color 506 of an avatar, as shown in FIG. 5. In some embodiments, an image-capturing device 224 (e.g., camera) may be used to capture an appearance of the user and modify the visual characteristic of the avatar based on the captured image, resulting in an avatar with visual attributes similar to the user's (e.g., same body shape or clothes). An image can be uploaded, and an uploaded image may be used to generate an avatar of interest 504. A user may customize various features of the avatar so that the avatar resembles a person of interest in appearance as the avatar is in the real world. In some embodiments, a special avatar 502 may be generated based on a public figure (e.g., Justin Bieber) or virtual character of a content item (e.g., Harry Potter). A user may also find an avatar 508 by looking up a character online or a preconfigured avatar stored in a configuration file associated with the user.

Figure 6:
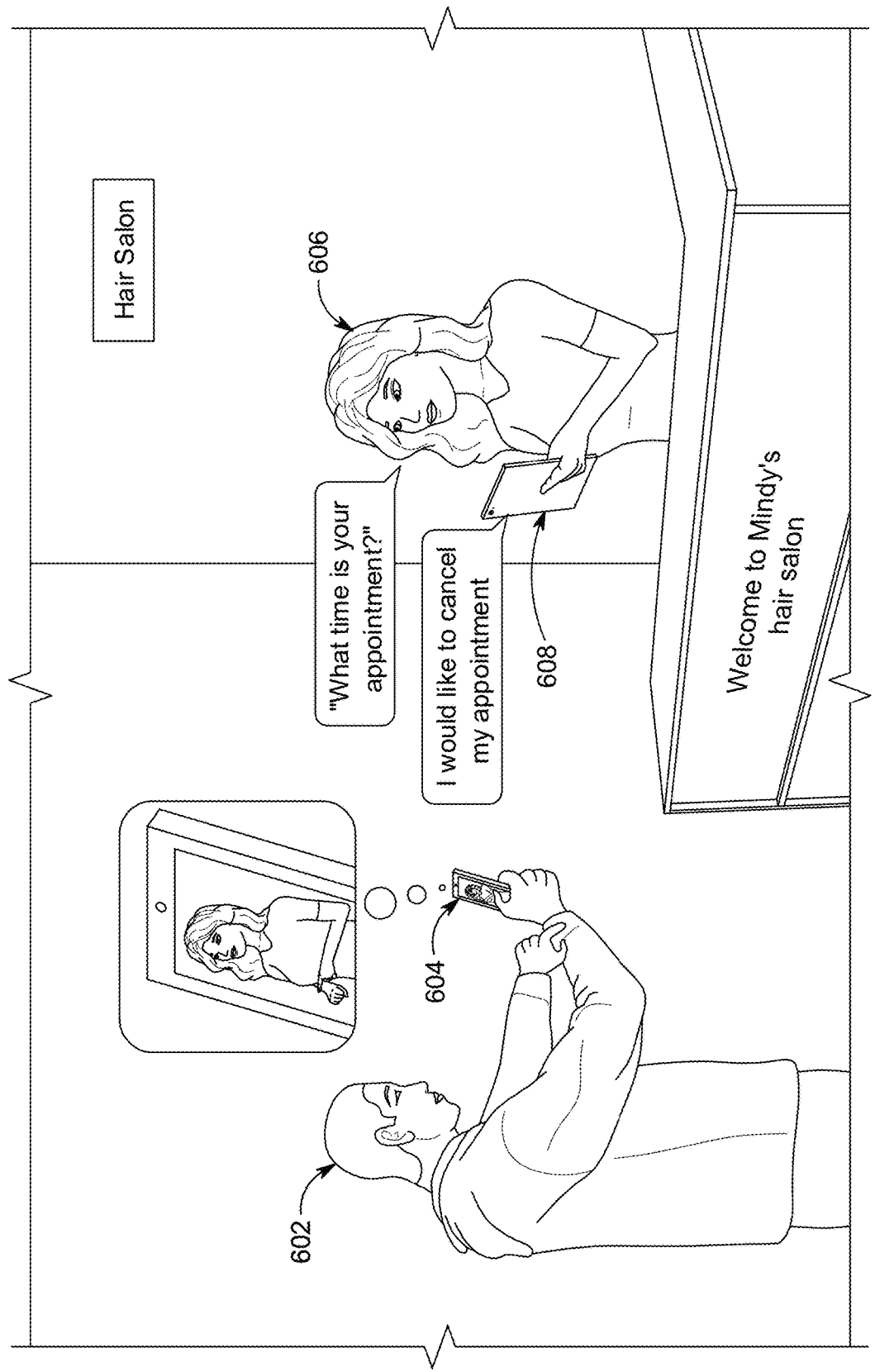
FIG. 6 depicts an exemplary embodiment for processing signs in real time for interacting with a non-sign user, in accordance with some embodiments of the disclosure.

FIG. 6 depicts an exemplary embodiment 600 for processing signs in real time for interacting with a non-sign user, in accordance with some embodiments of the disclosure. In exemplary embodiment 600, a sign user 602 interacts with a clerk 606 at a hair salon using sign user's device 604. If sign user 602 speaks sign language ("I would like to cancel my appointment"), then a clerk's device 608 captures a gesture of sign user 602 speaking the sign language via a camera of clerk's device 608. Based on the captured gesture (e.g., left hand pointing to right wrist), a translation application running on clerk's device 608 translates the sign language and converts the sign language into text. The translated text is displayed on clerk's device 608 or is output as audio via a speaker of clerk's device 608. In some embodiments, clerk's device receives the translation from the cloud (e.g., the translation of the sign language is uploaded to the cloud). In response to the user request for cancellation, clerk 606 responds by saying, "What time is your appointment?" In response to clerk 606 saying "What time is your appointment," sign user's device 604 detects a clerk's voice via microphone 226 of sign user's device 604 and converts the voice input into a corresponding sign for sign user 602 using the above-explained speech-to-text techniques, text-to-sign language techniques, or avatar generation techniques.

In some embodiments, the emotion of clerk 606 is determined using sentiment analysis module 236. The camera of sign user's device 604 captures a facial expression or the body expression of clerk 606. Based on the captured image or video of the clerk, the translation application determines the emotional state of clerk 606 using the above-explained sentiment analysis techniques. The determined emotional state of clerk 606 is exhibited on the face of clerk's avatar generated for display on sign user's device 604. Thus, if the tone or expression of clerk 606 is "neutral," then a neutral emotion will be expressed on the face of the clerk's avatar using one or more facial features.

In some embodiments, the captured image of clerk 606 may be used to modify the visual characteristic of the clerk's avatar on sign user's device 604. Without the user modifying the visual characteristics of the clerk's avatar on sign user's device 604, visual characteristics of the clerk, such as curly hair and V-neck shirt, may be identified automatically, and the appearance of the clerk's avatar may be modified to resemble the appearance of the clerk in real time. Because the clerk's avatar resembles clerk 606, sign user 602 may feel like he is directly interacting with clerk 606, facilitating the real-time communication with a non-sign user.

Figure 7:
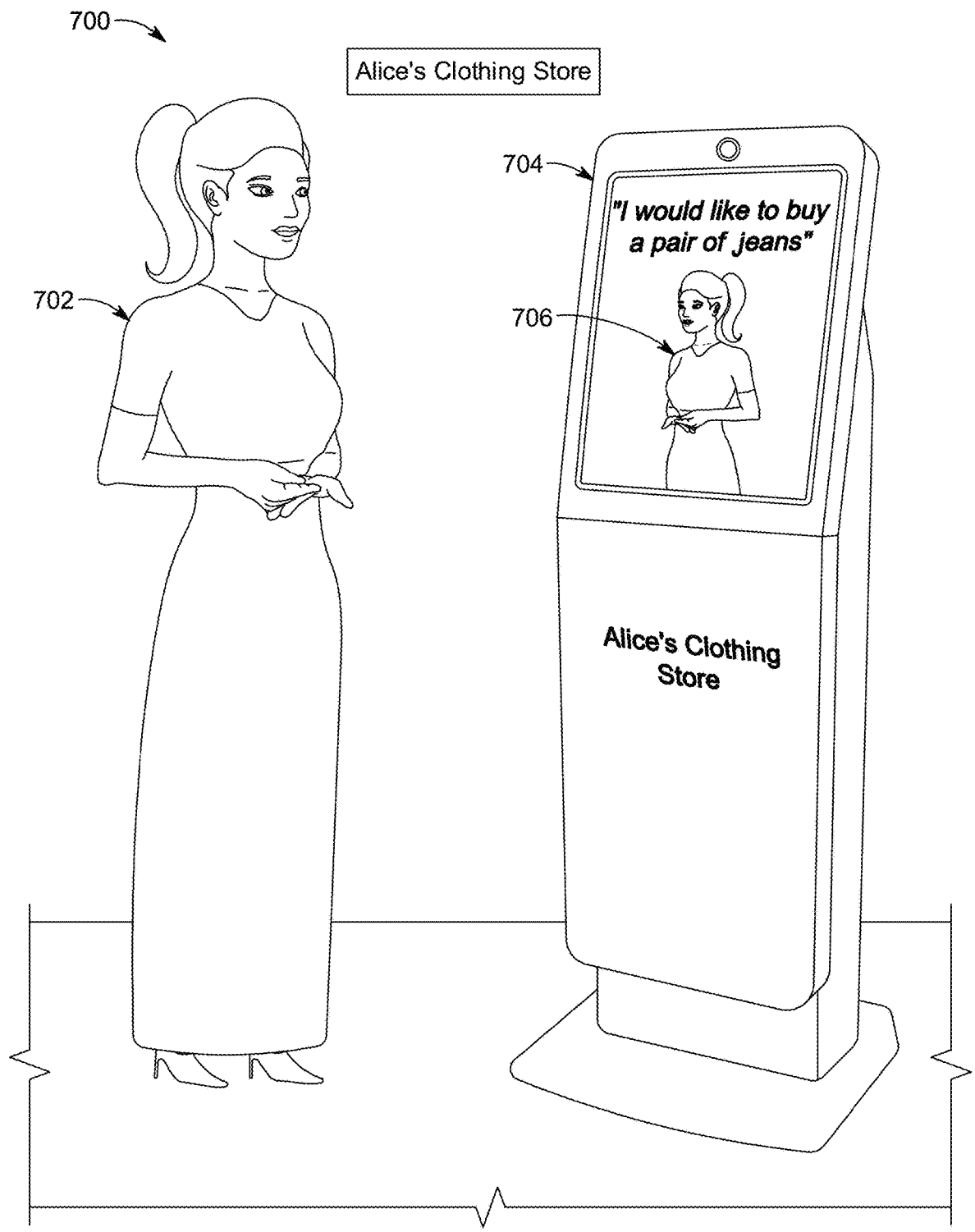
FIG. 7 depicts an exemplary embodiment for sharing an avatar to a different device, in accordance with some embodiments of the disclosure.

FIG. 7 depicts an exemplary embodiment 700 for sharing an avatar to a different device, in accordance with some embodiments of the disclosure. For example, a sign user 702 is at a clothing store, and the user may initiate a transfer of the user's avatar to a commercial kiosk 704 that is configured to display user's avatar 706 located at a store. The personalized avatar setting (e.g., skin tone, hair) may be stored in a configuration file that is part of the translation application running on the user device and is shared to the kiosk 704 using any sharing protocols, such as Bluetooth or NFC (i.e., Near Field Communication). This way, the user does not have to use their own device to communicate with another party (i.e., non-sign users), but the user's personalized avatar 706 can be displayed on a device different from the user's device.

In some embodiments, the user's avatar 706 may resemble the appearance of the user as the user is interacting with kiosk 704. An image-capturing module of the kiosk 704 may capture the user's image in real time and identifies visual features (e.g., hair, clothes), and applies the identified visual features to the pre-stored avatar such that the avatar resembles the user in its appearance.

Similar to the exemplary embodiment shown in FIG. 6, the translation application running on commercial kiosk 704 may display the translated text on a display screen. Commercial kiosk 704 may capture an image or a video of sign user 702 using a camera installed on commercial kiosk 704 while sign user 702 is performing a "buy" sign and translates the gesture of sign language to text or speech using the above-mentioned translation techniques. This way, a non-sign user can simply look at the commercial kiosk, which has a bigger screen, to communicate with a sign user, creating a smooth communication experience for both a sign user and a non-sign user, because a higher number of non-sign users can read the message communicated by the sign user.

Figure 8:
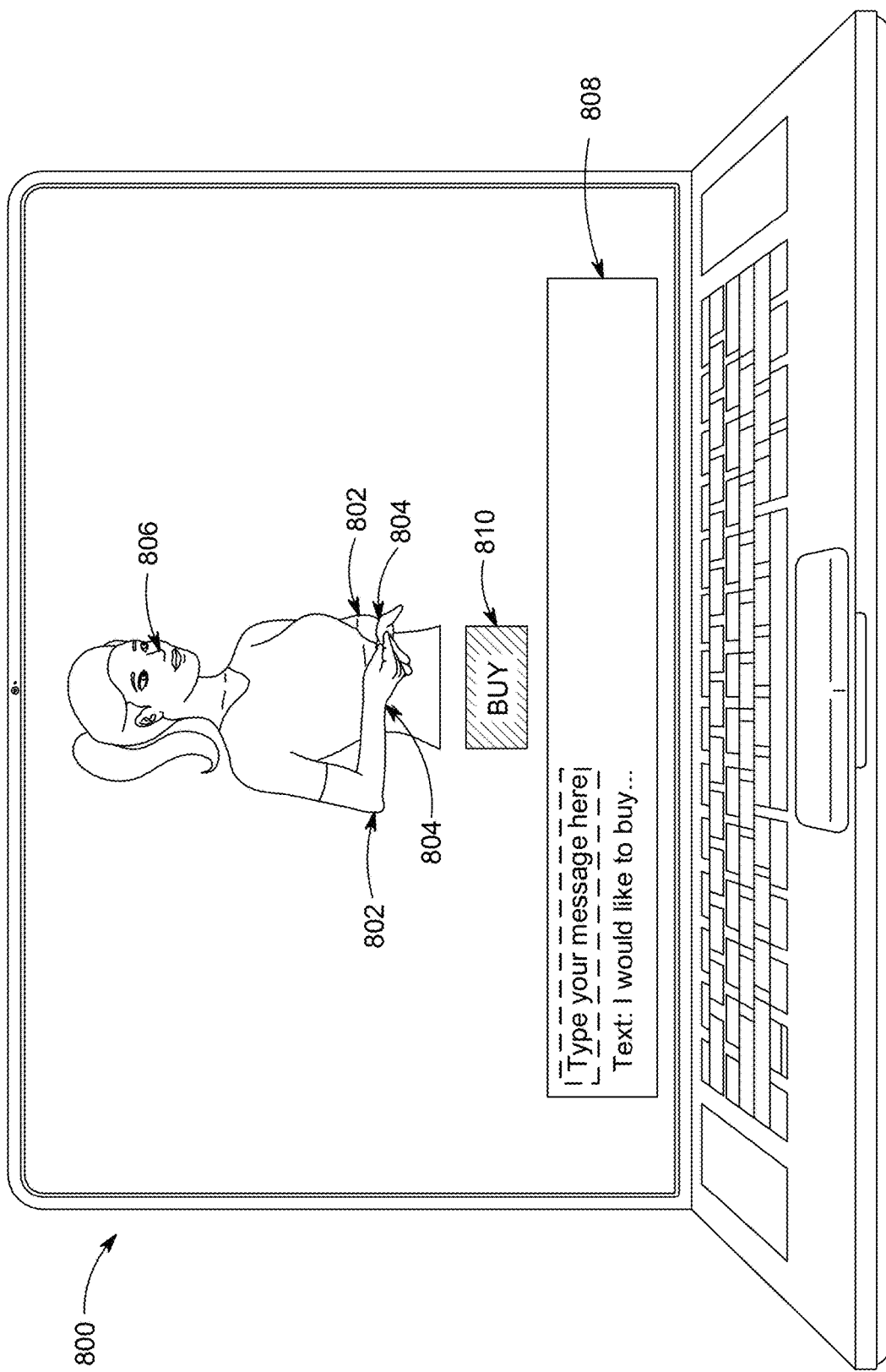
FIG. 8 depicts an exemplary user interface for providing a command for an avatar to perform, in accordance with some embodiments of the disclosure.

FIG. 8 depicts an exemplary user interface 800 for providing a command for an avatar to perform, in accordance with some embodiments of the disclosure. In some embodiments, the translation application animates the movement of the avatar based on user input specifying a command. For example, if the user already knows that putting the right hand fingers on the left hand means "buy" and the user does not want to type in "buy," then the user can simply input the command "put the right hand fingers on the left hand" via the user interface of the computing device. The command is transmitted, and the transformation of the avatar is executed on a user device based on the user input. The animation parameters of the avatar are modified so that the avatar moves its right hand according to the command. In some embodiments, the translation application may translate the input to a corresponding sign. For example, if the user types in "I would like to buy . . . " 808, then the translation application identifies a sign corresponding to "buy" 810 and presents the avatar performing the "buy" sign for display.

The transformation of the avatar based on the user input is achieved by identifying relevant skeleton models underlying the avatar structure to perform the command. As shown in FIG. 8, the "buy" sign involves moving the arms and the fingers. One or more skeleton models are applied to the avatar for performing the "buy" sign, and each skeleton model includes references to the joints. As shown by an avatar displayed in exemplary user interface 800, a hand skeleton model includes references to the different wrists 804 (e.g., left wrist, right wrist). An arm model references different joints of the arm 802 (e.g., above the elbow, below the elbow). A face model includes references to different parts of the face 806, such as the left eye, right eye, forehead, lips, etc. Although three skeleton models are used above as an example, there may be other skeleton models that involve different parts of the body to perform a sign.

The translation application identifies that at least two skeleton models 'the arm model and finger model', are involved in performing the "buy" sign. Upon identifying the relevant skeleton models, the translation application modifies animation parameters of the joints (e.g., vertices) of the arms and fingers based on the required movements of the joints of a gesture associated with the "buy" sign. The joints are connected such that changes to one or more vertices affect other parts of the joints, resulting in a balanced movement of the avatar. The translation application changes the relative position of the joints in the arms and fingers of the avatar.

Figure 9:
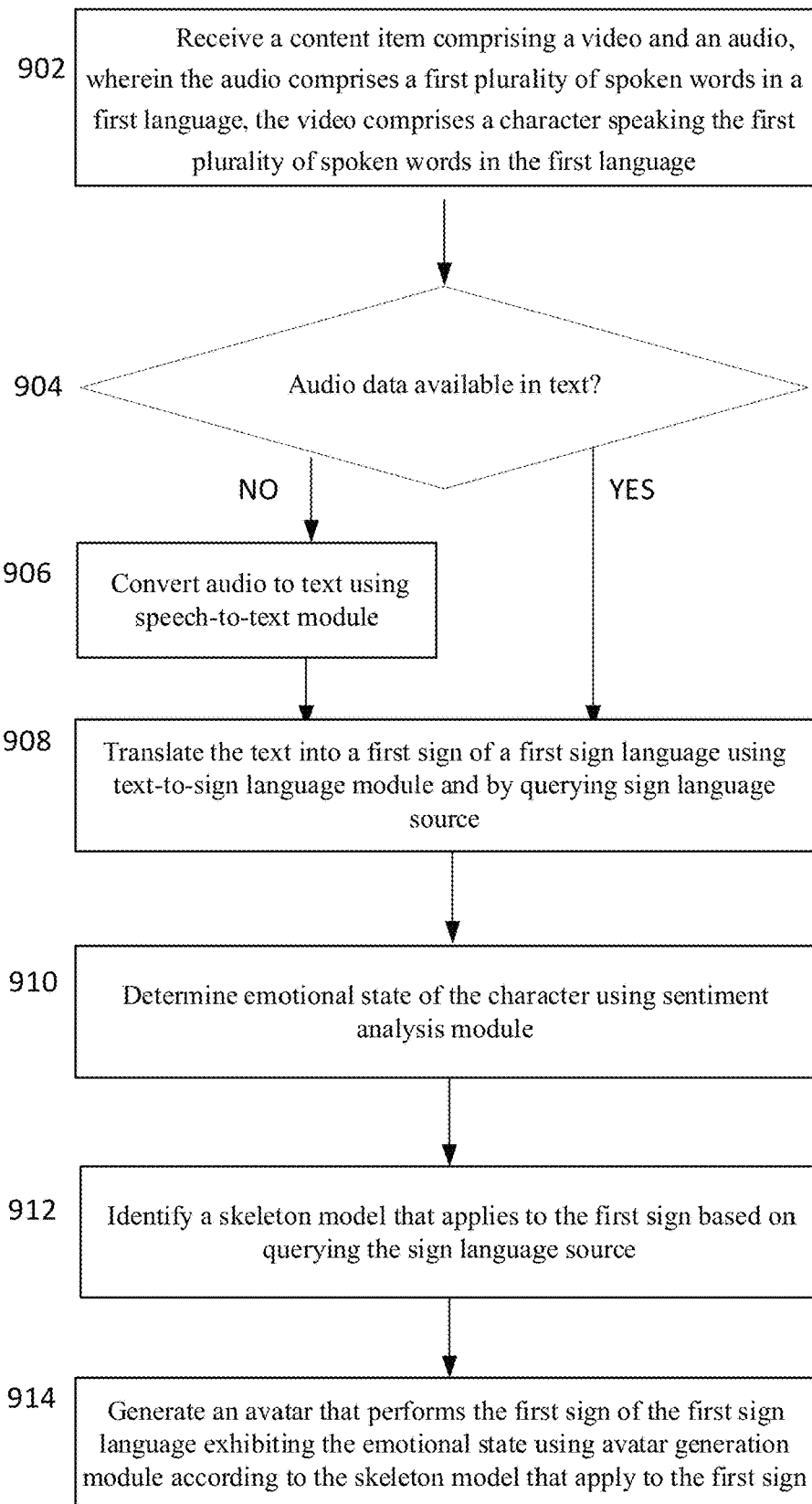
FIG. 9 depicts a flowchart of the process of generating an avatar that speaks sign language for a content item, in accordance with some embodiments of the disclosure.

FIG. 9 depicts a flowchart of the process 900 for generating a virtual avatar for a content item in accordance with some embodiments of the disclosure. It should be noted that process 900 may be performed by control circuitry 202, 210 of FIG. 2 as instructed by a translation application that may be performed on any device 114 of FIG. 2. In addition, one or more steps of process 900 may be incorporated into or combined with one or more embodiments (e.g., user interface 300 of FIG. 3, user interface 400 of FIG. 4, user interface 500 of FIG. 5, embodiment 600 of FIG. 6, embodiment 700 of FIG. 7, user interface 800 of FIG. 8). Process 900 may be performed in accordance with the components discussed in connection with FIGS. 1-2.

The user may request a presentation of a content item (e.g., "romantic movie") via a translation application running on computing device 114. In response to the request, at step 902, control circuitry 202 receives a content item from a content item source 106. The content item contains a video component and an audio component. The audio component includes a first plurality of spoken words (e.g., "I love you")

in a first language (e.g., English). The video component includes a character (e.g., Sally in FIG. 3) who speaks the first plurality of spoken words in the first language.

At step 904, control circuitry 202 determines whether audio data is available in text. For example, control circuitry 202 determines whether closed caption data or subtitle data associated with the content item is available. The audio data may be downloaded from one or more sources related to the content item. If the audio data is not available, then the process proceeds to 906.

At step 906, control circuitry 202 converts the first plurality of spoken words contained in the speech into text using one or more speech recognition or voice recognition techniques. Any machine learning-based speech-to-text algorithms may be used to convert a speech to text. For example, a visual speech recognition technique, such as a lipreading technique, may be used to interpret the movements of the lips, face, or tongue to decipher the speech.

If audio data is available, then process 900 proceeds to step 908. At step 908, control circuitry 202 translates the first plurality of spoken words into a first sign of a first sign language. The translation application parses the text and queries sign language source 108 one word at a time to identify a corresponding sign. Sign language source 108 includes a sign language dictionary that contains several videos or images of sign language signs, fingerspelled words, or other common signs used within a particular country. Based on the corresponding gestures or motions contained in the videos or images, the translation application identifies a corresponding sign.

At step 910, control circuitry 202 performs sentiment analysis of the character in the content item. The emotional state may be determined by at least spoken words of the speech, vocal tone, facial expression, or body expression of the character in the content item. For example, if the text includes an emotion identifier word (e.g., the word "happy"), then control circuitry 202 determines that the emotion of the speaker is happy. In another example, if the speaker is smiling or makes a big movement of the arms, then control circuitry 202 is likely to determine that the speaker is happy based on the facial or body expression of the speaker. This can be achieved by image analysis of the content. If the speaker speaks with a certain pitch (e.g., high pitch), then control circuitry 202 is likely to determine that the speaker is happy based on the vocal tone of the speaker. Control circuitry 202 may determine the emotional state of the speaker based on the context of the content item or metadata of the content item. Based on the metadata that includes chapter information (e.g., the climax of the movie or ending scene), control circuitry 202 may infer the emotional state of the speaker. The above means to determine the emotional state of the speaker listed are not an exclusive list and can include other means that are not listed above.

At step 912, control circuitry 202 identifies a skeleton model that is involved in performing the identified sign. This is accomplished by retrieving visual content from sign language source 108 that contains a movement or gesture associated with the first sign. Based on the movement or gesture, such as joint movements, control circuitry identifies a relevant skeleton model that is required in making a similar movement or gesture. For example, coordinates for initial positions of the relevant joints and final positions of the relevant joints of the relevant parts of the body are identified in the visual content.

At step 914, control circuitry 202 generates a virtual avatar that performs the identified sign. Control circuitry 202 modifies animation parameters of the joints (e.g., vertices) of the avatar associated with the skeleton model based on the movement or gesture (e.g., relative coordinates differences) contained in the visual content retrieved from sign language source 108. Control circuitry 202 changes the positions of the vertices of the avatar in a portion of frames to make a similar movement or gesture contained in the virtual content.

The generated virtual avatar exhibits the previously determined emotional state (e.g., happy expression on the face of the avatar). Thus, a tone or mood of the character in the content item is expressed by the avatar to indicate an emotional state of the character (e.g., mocking, sarcastic, laughing). The determined emotional state of the character is reflected in the face and body of the avatar to mimic the emotion of the character. The content item and the avatar are concurrently presented to the user for display in a two-dimensional or three-dimensional graphical representation via the user interface of computing device 114. The movement of the avatar is displayed on the first device as a series of images that are displayed in sequence as a video.

Figure 10:
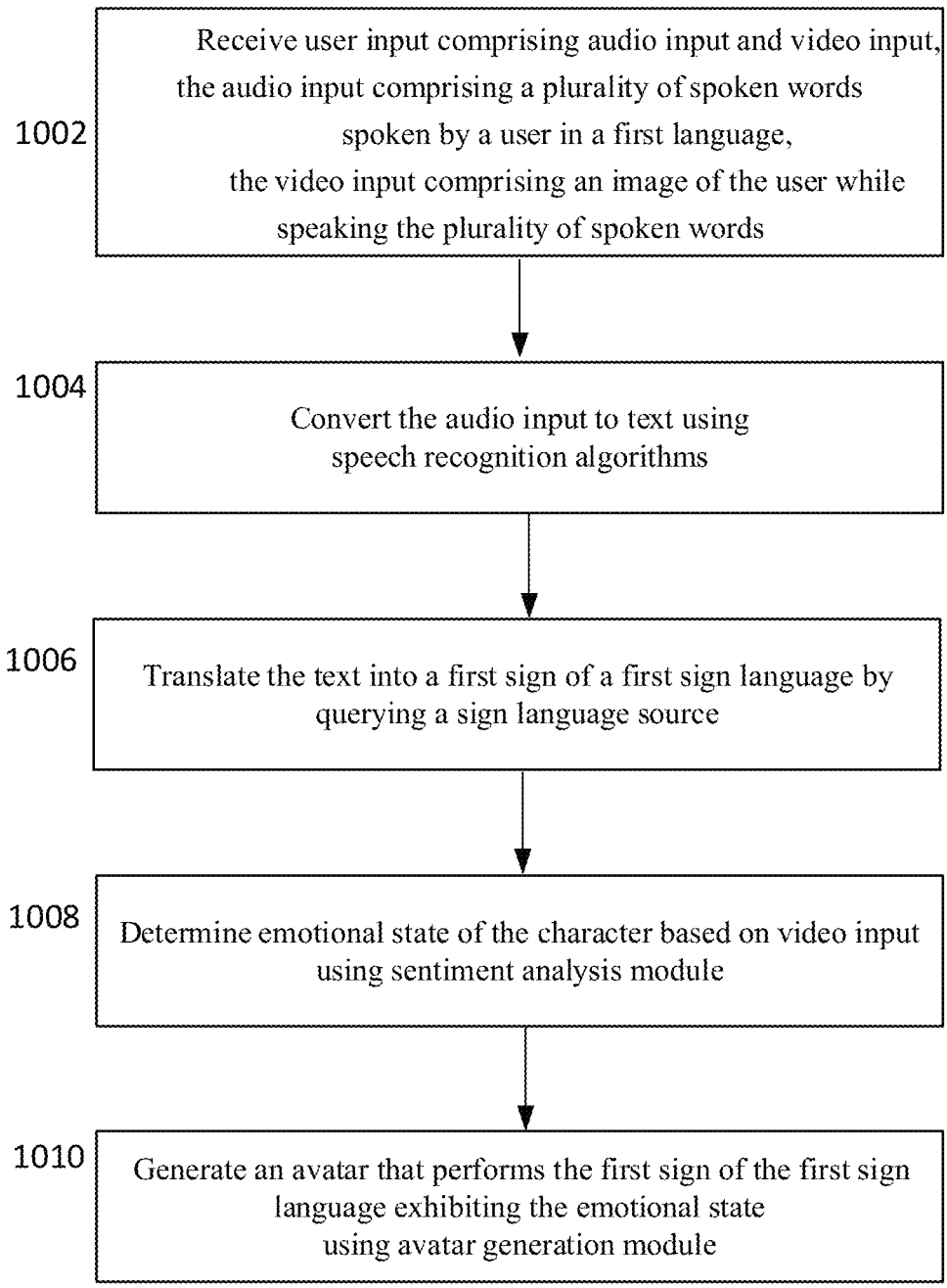
FIG. 10 depicts a flowchart of the process of generating a live avatar that speaks sign language in real time, in accordance with some embodiments of the disclosure.

FIG. 10 depicts a flowchart of the process 1000 for generating a live avatar in real time, in accordance with some embodiments of the disclosure. It should be noted that process 1000 may be performed by control circuitry 202, 210 of FIG. 2 as instructed by a translation application that may be performed on any device 114 of FIG. 2. In addition, one or more steps of process 1000 may be incorporated into or combined with one or more embodiments (e.g., user interface 300 of FIG. 3, user interface 400 of FIG. 4, user interface 500 of FIG. 5, embodiment 600 of FIG. 6, embodiment 700 of FIG. 7, user interface 800 of FIG. 8). Process 1000 may be performed in accordance with the components discussed in connection with FIGS. 1-2.

At step 1002, control circuitry 202 receives user input from computing device 114 via communication network 112. Computing device 114 detects a user in proximity to computing device 114 using camera 224 and receives audio input using microphone 226 of computing device 114. The audio input includes a plurality of spoken words spoken by the user in a first language. Computing device 114 receives video input of the user while the user is speaking the first plurality of words.

At step 1004, control circuitry 202 converts the first plurality of spoken words contained in the audio input into text using one or more speech recognition or voice recognition techniques. Any machine learning-based speech-to-text algorithms may be used to convert a speech to text. For example, a visual speech recognition technique, such as a lipreading technique, may be used to interpret the movements of the lips, face, or tongue to decipher the speech.

At step 1006, control circuitry 202 translates the first plurality of spoken words into a first sign of a first sign language. The translation application parses the text and queries sign language source 108 one word at a time to identify a corresponding sign. Sign language source 108 includes a sign language dictionary that contains several videos or images of sign language signs, fingerspelled words, or other common signs used within a particular country. Based on the corresponding gestures or motions contained in the videos or images, the translation application identifies a corresponding sign for the text.

At step 1008, control circuitry 202 performs sentiment analysis of the user in proximity to the device. The emotional state may be determined by at least spoken words of the speech, vocal tone, facial expression, or body expression of the user. For example, if the text includes an emotion identifier word (e.g., the word "happy"), then control circuitry 202 is likely to determine that the emotion of the speaker is happy. In another example, if the speaker is smiling or makes a big movement with the arms, then control circuitry 202 is likely to determine that the speaker is happy based on the facial or body expression of the speaker. This can be achieved by image analysis of the content. If the speaker speaks with a certain pitch (e.g., high pitch), then control circuitry 202 is likely to determine that the speaker is happy based on the vocal tone of the speaker. The above means to determine the emotional state of the speaker listed are not an exclusive list and can include other means that are not listed above.

At step 1010, control circuitry 202 generates a real-time avatar that performs the identified sign. This is accomplished by positioning the vertices of the avatar according to one or more skeleton models underlying the avatar structure. Once the sign is identified, control circuitry 202 identifies one or more skeleton models that are involved in performing the sign. Control circuitry 202 modifies animation parameters of the joints (e.g., vertices) of the avatar corresponding to the movement or gesture associated with the identified sign retrieved from sign language source 108 using the identified skeleton model. Control circuitry 202 animates the movement of hands, fingers, and facial expressions of an avatar by changing the relative position of the joints in the hands, fingers, arms, or other parts of the face of the avatar.

The generated avatar exhibits the previously determined emotional state (e.g., happy expression on the face of the avatar). Thus, a tone or mood of the user is expressed by the avatar to indicate an emotional state of the user (e.g., mocking, sarcastic, laughing). The determined emotional state of the user is reflected in the face and body of the avatar to mimic the emotion of the user. The avatar performing the identified sign and exhibiting the emotional state of the speaker is presented to the user for display in a two-dimensional or three-dimensional graphical representation via the user interface of computing device 114.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   capturing video data using a camera of a device and capturing audio data using a microphone of the device;
   extracting a spoken word from the audio data and an image of a speaker who uttered the spoken word from the video data;
   querying a sign language database to determine a translation of the spoken word to a sign language gesture;
   identifying visual characteristics of the speaker based on the extracted image of the speaker who uttered the spoken word;
   generating an avatar based on the identified visual characteristics of the speaker who uttered the spoken word;
   identifying in a model database, a skeleton model representing the sign language gesture; and
   generating for display an animation of the avatar that was generated based on the identified visual characteristics of the speaker who uttered the spoken word performing the sign language gesture by applying the skeleton model to the avatar.

2. The method of claim 1, further comprising:
   determining an emotional state expressed of the speaker who uttered the spoken word based on sentiment analysis; and
   wherein the generated avatar exhibits the determined emotional state.

3. The method of claim 2, wherein the sentiment analysis is performed by:
   determining an emotion identifier contained in the spoken word;
   determining a facial expression or a body expression of the speaker who uttered the spoken word using one or more expression recognition algorithms; and
   determining a vocal tone of the speaker who uttered the spoken word using one or more voice recognition algorithms.

4. The method of claim 1, wherein the animation of the avatar comprises a movement of a hand, a finger, an arm, or a face of the avatar.

5. The method of claim 1, further comprising:
   converting the spoken word into a text using one or more speech recognition algorithms, the text comprising a word corresponding to the spoken word.

6. The method of claim 1, wherein the speaker who uttered the spoken word is a live individual.

7. The method of claim 1, further comprising:
   receiving user input specifying a visual characteristic of the avatar, wherein the avatar is modified based on the specified visual characteristic.

8. The method of claim 1, further comprising:
   receiving a user request to transmit the avatar to a second device;
   transmitting a configuration file that includes a visual characteristic of the avatar to the second device; and
   causing display of the avatar based on the transmitted configuration file on the second device.

9. The method of claim 1, wherein the avatar is automatically generated in real time.

10. A system comprising:
    control circuitry configured to:
        capture video data using a camera of a device and capture audio data using a microphone of the device;
        extract a spoken word from the audio data and an image of a speaker who uttered the spoken word from the video data;
        query a sign language database to determine a translation of the spoken word to a sign language gesture;
        identify visual characteristics of the speaker based on the extracted image of the speaker who uttered the spoken word;
        generate an avatar based on the identified visual characteristics of the speaker who uttered the spoken word;
        identify in a model database, a skeleton model representing the sign language gesture; and generate for display an animation of the avatar that was generated based on the identified visual characteristics of the speaker who uttered the spoken word performing the sign language gesture by applying the skeleton model to the avatar.

11. The system of claim 10, the control circuitry further configured to determine an emotional state expressed of the speaker who uttered the spoken word based on sentiment analysis and wherein the generated avatar exhibits the determined emotional state.

12. The system of claim 11, the control circuitry further configured to perform the sentiment analysis by:
   determining an emotion identifier contained in the spoken word;
   determining a facial expression or a body expression of the speaker who uttered the spoken word using one or more expression recognition algorithms; and
   determining a vocal tone of the speaker who uttered the spoken word using one or more voice recognition algorithms.

13. The system of claim 10, wherein the animation of the avatar comprises a movement of a hand, a finger, an arm, or a face of the avatar.

14. The system of claim 10, the control circuitry further configured to:
   convert the spoken word into text using one or more speech recognition algorithms, the text comprising a text word corresponding to the spoken word.

15. The system of claim 10, wherein the speaker who uttered the spoken word is a live individual.

16. The system of claim 10, the control circuitry further configured to receive user input specifying a visual characteristic of the avatar, wherein the avatar is modified based on the specified visual characteristic.

17. The system of claim 10, the control circuitry further configured to:
   receive a user request to transmit the avatar to a second device;
   transmit a configuration file that includes a visual characteristic of the avatar to the second device; and
   cause display of the avatar based on the transmitted configuration file on the second device.

18. The system of claim 10, wherein the avatar is automatically generated in real time.

* * * * *